United States Patent Office 3,591,603
Patented July 6, 1971

3,591,603
3(3-INDOLE)-LOWER-ALKYLAMINES
Zinon B. Papanastassiou, Lexington, and John L. Neumeyer, Wayland, Mass., assignors to Arthur D. Little, Inc., Cambridge, Mass.
No Drawing. Filed May 13, 1968, Ser. No. 728,818
Int. Cl. C07d 27/56
U.S. Cl. 260—326.15    6 Claims

ABSTRACT OF THE DISCLOSURE

New 3-indoleglyoxamides and (3-indole)-lower-alkylamines having useful C.N.S. depressant activity and prepared, respectively, by reaction of a 3-indoleglyoxalyl halide or a (3-indole)-lower-alkyl halide with an appropriate amine.

---

One aspect of this invention relates to (3-indole)-lower-alkylamines having the formula:

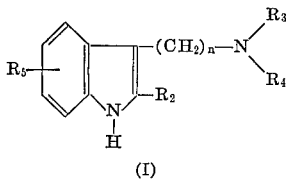

where $R_2$ is hydrogen or lower-alkyl; $R_3$ is 2-propynyl or lower-alkyl; $R_4$ is 2-propynyl, or $R_3$ and $R_4$, together with the nitrogen atom to which they are attached, represent an ethyleneimino radical,

$R_5$ is hydrogen or lower-alkoxy; and $n$ is one of the integers 1 and 2.

In another aspect, the present invention relates to compounds having the formula:

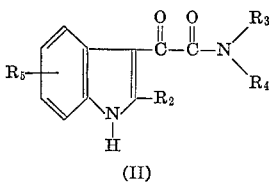

where $R_1$, $R_2$, $R_4$ and $R_5$ have the meanings given above.

In a third aspect, the invention relates to N-(2-fluoroethyl)-N-[2-(3-indole)ethyl]amines having the formula:

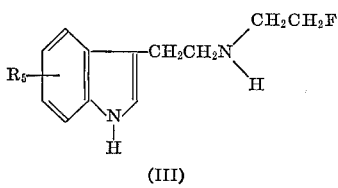

where $R_5$ has the meanings given above.

In the terms "lower-alkyl" and "lower-alkoxy," which can be written R and OR, respectively, the portion R is any saturated, monovalent hydrocarbon radical, including straight or branched chain radicals of from one to six carbon atoms, as illustrated by, but not limited to methyl, ethyl, n-propyl, isopropyl, n-hexyl, methoxy, ethoxy, n-propoxy, isopropoxy, n-hexyloxy, and the like. Moreover, when $R_5$ represents lower-alkoxy, it can occupy either the 4-, 5-, 6-, or 7-positions of the indole nucleus.

The compounds of Formula I are useful as central nervous system depressants, while the compounds of Formulas II and III are useful as anti-depressant agents.

The compounds of Formulas I and III are prepared by reacting a (3-indole)-lower-alkyl halide with an appropriate amine in an organic solvent inert under the conditions of the reaction, for example, methanol, ethanol, isopropanol, toluene, and the like, and in the presence of an acid-acceptor, which serves to take up the hydrogen halide split out during the course of the reaction. Suitable acid-acceptors are alkali metal carbonates or bicarbonates, tri-lower-alkylamines, and the like. An excess of the amine reactant also can serve advantageously as the acid-acceptor.

Alternatively, the compounds of Formula I where $R_4$ is 2-propynyl and $R_3$ is lower-alkyl are prepared by reaction of the compounds where $R_3$ is lower-alkyl and $R_4$ is hydrogen with a 2-propynyl halide under the same conditions as described above for the preparation of the compounds of Formula I, that is in an organic solvent inert under the conditions of the reaction and in the presence of an acid-acceptor.

The compounds of Formula II are prepared by reacting a 3-indoleglyoxalyl halide with an appropriate amine in the presence of an acid-acceptor, for example, N,N-dimethylaniline, pyridine, or a tri-lower-alkylamine, in an organic solvent inert under the conditions of the reaction, for example, tetrahydrofuran, diethyl ether, dibutyl ether, and the like. It is preferred to carry out the reaction in tetrahydrofuran in the presence of a tri-lower-alkylamine as the acid-acceptor, for example, triethylamine.

The acid-addition salts of the bases herein described are the form in which the bases are most conveniently prepared for use and are the full equivalents of the free bases of Formulas I, II and III. The acid moieties or anions in these salt forms are in themselves neither novel nor critical and therefore can be any acid anion or acid-like substance capable of salt formation with the free base form of the compounds. The preferred type of salts are water-soluble pharmacologically-acceptable salts, that is, salts whose anions are relatively innocuous to the animal organisms in pharmacological doses of the salts, so that the beneficial physiological properties inherent in the free bases are not vitiated by side effects ascribable to the anions; in other words, the latter do not substantially affect the pharmacological properties inherent in the cations. In practicing the invention, it has been found convenient to form the hydrochloride or hydrogen oxalate salts. However, other appropriate pharmacologically-acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate, and quinate salts, respectively.

Although pharmacologically-acceptable salts are preferred, those having toxic anions are also useful. All acid-addition salts are useful intermediates as sources of the free base form even if the particular salt per se is not desired as the final product, as for example when the salt is formed only for the purpose of purification or identification, or when it is used as an intermediate in preparing a pharmacologically-acceptable salt by ion-exchange procedures.

The compounds of Formula I are C.N.S. depressants as determined in mice in the standard and recognized primary general screening test described by Vane, Evaluation of Drug Activities: Pharmacometrics (edited by Laurence and Bacharach), vol. 1, pages 23–41, London and New York (1964), and especially at pages 33–36; and by Irwin, Animal and Clinical Pharmacologic Techniques in Drug Evaluation (edited by Nodine and Siegler), Yearbook Medical Publishers, Inc., Chicago, Ill., pages 36–54 (1964) and especially pages 45–54.

The compounds of Formulas II and III are antidepressants as determined in the standard and recognized test for determining monoamine oxidase inhibition as described by Wurtman and Axelrod, Biochem. Pharmacol., 12, 1439 (1963).

The compounds can be prepared for use by dissolving or suspending them in aqueous alcohol, glycol or oil solution. or oil-in-water emulsions in the same manner as conventional medicinal substances are prepared. Alternatively, they can be incorporated in unit dosage form as tablets or capsules for oral administration either alone or in combination with suitable adjuvants such as calcium carbonate, starch, lactose, talc, magnesium stearate, gum acacia, and the like. The compounds are administered to any suitable mammalian host in a dose range of 2–100 mg./kg.

The chemical structures of the compounds of the invention are established by their mode of synthesis and are corroborated by infrared and ultraviolet spectra and by the correspondence between calculated values for the elements and values found by chemical analysis.

The following examples will further illustrate specific embodiments without the invention being limited thereto. The melting points are uncorrected.

EXAMPLE 1

N,N-di-(2-propynyl)-N-[2-(3-indole)ethyl]amine

A solution of 4.16 g. (0.04 mole) of N.N-di-(2-propynyl)amine in 50 ml. of isopropanol was added with stirring to a solution of 5 g. (0.02 mole) of 3-(2-bromoethyl)indole in 75 ml. of isopropanol, and the reaction mixture was stirred under reflux for four hours and then cooled and filtered. The filtrate was taken to dryness in vacuo, the residue was extracted with ether, and the extracts taken to dryness. Recrystallization of the resulting solid residue from ethyl acetate/petroleum ether, gave 2.4 g. of N,N-di-(2-propynyl)-N-[2-(3-indole)ethyl]amine, M.P. 92–93° C.

Analysis.—Calcd. for $C_{16}H_{16}N_2$ (percent): C, 81.2; H, 6.82; N, 11.85. Found (percent): C, 81.9; H, 7.66; N, 10.61.

The hydrochloride salt was prepared by adding an ethereal solution of hydrogen chloride to an ethereal solution of the amine. The solid which separated was collected and recrystallized from ethanol/ether to give N,N-di-(2-propynyl)-N-[2-(3-indole)ethyl]amine hydrochloride, M.P. 143–144° C.

EXAMPLE 2

N-[2-(3-indole)ethyl]ethyleneimine was prepared by adding 58 ml. (46.4 g., 1.1 mole) of ethyleneimine to a solution of 8 g. (0.036 mole) of 3-(2-bromoethyl)indole in 500 ml. of dry toluene. The reaction mixture was stirred at room temperature for twenty minutes and then heated under reflux for one hour. After cooling, the organic layer was decanted, and the excess ethyleneimine was removed by concentration of the solution. The residue was washed four times with 50 ml. portions of cold, saturated brine solution, the combined aqueous layers were extracted with two 50 ml. portions of toluene, and the combined toluene extracts were dried over anhydrous magnesium sulfate, charcoaled, filtered, and evaporated to dryness. The residue was treated with ether, the white solid which separated was removed by gravity filtration, and the ether filtrate was evaporated to dryness leaving 1.5 g. of N-[2-(3-indole)-ethyl]ethyleneimine as a clear amber glass.

Analysis.—Calcd. for $C_{12}H_{14}N_2$ (percent): C, 77.38; H, 7.58; N, 15.04. Found (percent): C, 77.14; H, 7.68; N, 15.41.

EXAMPLE 3

N-(2-fluoroethyl)-N-[2-(3-indole)ethyl]amine hydrochloride was prepared by reaction of 5.8 g. (0.09 mole) of 2-fluoroethylamine with 2 g. (0.009 mole) of 3-(2-bromoethyl)indole using the procedure described above in Example 1. The product, 1.3 g., was isolated in the form of the free base as a yellow oil, which was converted to the hydrochloride salt in diethyl ether giving N-(2-fluoroethyl) - N - [2 - (3-indole)-ethyl]amine hydrochloride, M.P. 173–178° C.

Analysis.—Calcd. for $C_{12}H_{16}ClFN_2$ (percent): C, 59.37; H, 6.64; N, 11.54. Found (percent): C, 59.83; H, 6.68; N, 11.18.

EXAMPLE 4

N-methyl - N - (2-propynyl) - N - [(3-indole)methyl] amine hydrogen oxalate was prepared by reaction of N-methyl-N-[(3-indole)methyl]amine with an equimolar amount of propargyl bromide in 250 ml. of methanol in the presence of a molar excess of potassium carbonate. The product was isolated in the form of the free base, and the latter was converted to the hydrogen oxalate salt in a mixture of ethanol/chloroform/benzene giving N-methyl-N-(2-propynyl)-N-[(3-indole)methyl]amine hydrogen oxalate, M.P. 130–131° C.

Analysis.—Calcd. for $C_{15}H_{16}N_2O_4$ (percent): C, 62.50; H, 5.59; N, 9.72. Found (percent): C, 62.30; H, 5.73; N, 9.75.

EXAMPLE 5

N,N - di - (2-propynyl)-N-[2-(2-methyl-3-indole)ethyl]amine is prepared by reaction of 2-methyl-3-(2-bromoethyl)indole with N,N-di-(2-propynyl)amine in the presence of an acid acceptor using the procedure described above in Example 1.

EXAMPLE 6

3-indole-N,N-di-(2-propynyl)glyoxamide

To a solution of 22.5 g. (0.108 mole) of 3-indole-glyoxalyl chloride dissolved in 300 ml. of anhydrous tetrahydrofuran was added dropwise with cooling and stirring a solution of 10 g. (0.108 mole) of N,N-di-(2-propynyl)amine and 11 g. (0.108 mole) of triethylamine in 150 ml. of tetrahydrofuran. When addition was complete, the mixture was stirred at room temperature for twelve hours, the solid which separated was collected, washed with tetrahydrofuran, and the combined filtrates evaporated to dryness. The residual solid was recrystallized from a t-butanol/petroleum ether mixture giving 21.8 g. of 3-indole-N,N-di-(2-propynyl)-glyoxamide, M.P. 158–159° C.

Analysis.—Calcd. for $C_{16}H_{12}N_2O_2$ (percent): C, 72.71; H, 4.58; N, 10.60. Found (percent): C, 72.80; H, 4.55; N, 10.63.

EXAMPLE 7

(2 - methyl-3-indole)-N,N-di-(2 - propynyl)glyoxamide was prepared by reaction of (2-methyl-3-indole)glyoxalyl chloride with N,N-di-(2-propynyl)amine using the procedure described above in Example 6. There was thus obtained (2 - methyl-3-indole)-N,N-di-(2 - propynyl)glyoxamide, M.P. 149–150° C.

Analysis.—Calcd. for $C_{17}H_{14}N_2O_2$ (percent): C, 73.36; H, 5.07; N, 10.07. Found (percent): C, 73.61; H, 5.22; N, 9.82.

EXAMPLE 8

(5-methoxy-3-indole)-N,N-di-(2 - propynyl)glyoxamide was prepared from 12.7 g. (0.054 mole) of (5-methoxy-3-indole)glyoxalyl chloride and 5 g. (0.054 mole) of N,N-di-(2-propynyl)amine using the procedure described above in Example 6. There was thus obtained 11 g. of (5-methoxy - 3 - indole)-N,N-di-(2-propynyl)glyoxamide, M.P. 199–201° C.

Analysis.—Calcd. for $C_{17}H_{14}N_2O_3$ (percent): C, 69.37; H, 4.80; N, 9.52. Found (percent): C, 69.49; H, 4.98; N, 9.64.

EXAMPLE 9

N-[(3-indole)glyoxalyl]ethyleneimine was prepared by reaction of 37.8 g. (0.182 mole) of 3-indoleglyoxalyl chloride with 8.2 g. (0.19 mole) of ethyleneimine in a total of 1.15 liters of tetrahydrofuran in the presence of 18.5 g. (0.182 mole) of triethylamine using the procedure described above in Example 6. There was thus obtained 29 g. of N-[(3-indole)glyoxalyl]ethyleneimine, M.P. 199–202° C.

*Analysis.*—Calcd. for $C_{12}H_{10}N_2$ (percent): C, 67.28; H, 4.71; N, 13.08. Found (percent): C, 67.33; H, 4.92; N, 12.83.

EXAMPLE 10

(2-methyl-3-indole) - N - (2-propynyl)-N-methylglyoxamide is prepared by reacting a (2-methyl-3-indole)glyoxalyl halide with N-methyl-N-(2-propynyl)amine in the presence of triethylamine in tetrahydrofuran using the procedure described above in Example 6.

EXAMPLE 11

N,N - di - (2-propynyl)-N-[2-(4-methoxy-3-indole)ethyl]amine is prepared by reaction of 4-methoxy-2-methyl-3-(2-bromoethyl)indole with N,N-di-(2-propynyl)amine in the presence of an excess of the latter using the procedure described above in Example 1.

We claim:
1. A compound having the formula:

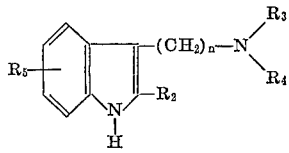

where $R_2$ is hydrogen or lower alkyl; $R_3$ is lower-alkyl or 2-propynyl; $R_4$ is 2-propynyl; or $R_3$ and $R_4$, together with the nitrogen atom to which they are attached, is ethyleneimino; $R_5$ is hydrogen or lower-alkoxy; and $n$ is one of the integers 1 and 2.

2. N,N-di-(2-propynyl) - N - [2-(3-indole)ethyl]amine according to claim 1 where $R_2$ and $R_5$ are hydrogen, $R_3$ and $R_4$ are 2-propynyl, and $n$ is 2.

3. N-methyl-N-(2 - propynyl)-N-[(3 - indole)methyl] amine according to claim 1 where $R_2$ and $R_5$ are hydrogen, $R_3$ is methyl, $R_4$ is 2-propynyl, and $n$ is 1.

4. N-[2 - (3 - indole)ethyl]ethyleneimine according to claim 1 where $R_2$ and $R_5$ are hydrogen, $R_3$ and $R_4$, together with the nitrogen atom to which they are attached, is ethyleneimino, and $n$ is 2.

5. The acid addition salts of the compounds of claim 1.

6. An acid addition salt in accordance with claim 5 wherein said acid is HCl.

References Cited

Chem. Abs.: ABS of Netherland Pat. No. 6406049 63:9916–17 (1965).

Noller: Chemistry of Organic Compounds (1965), p. 259.

ALEX MAZEL, Primary Examiner

J. A. NARCAVAGE, Assistant Examiner

U.S. Cl. X.R.

260—326.13; 424—274